(12) United States Patent
Troesch

(10) Patent No.: US 10,441,495 B2
(45) Date of Patent: Oct. 15, 2019

(54) GUIDING PEOPLE USING ACOUSTIC SIGNALS

(71) Applicant: INVENTIO AG, Hergiswil (CH)

(72) Inventor: Florian Troesch, Zurich (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 15/768,249

(22) PCT Filed: Oct. 10, 2016

(86) PCT No.: PCT/EP2016/074199
§ 371 (c)(1),
(2) Date: Apr. 13, 2018

(87) PCT Pub. No.: WO2017/063992
PCT Pub. Date: Apr. 20, 2017

(65) Prior Publication Data
US 2018/0296427 A1 Oct. 18, 2018

(30) Foreign Application Priority Data

Oct. 16, 2015 (EP) .................................. 15190261

(51) Int. Cl.
*A61H 3/06* (2006.01)
*G01C 21/20* (2006.01)
(Continued)

(52) U.S. Cl.
CPC .......... *A61H 3/061* (2013.01); *G01C 21/206* (2013.01); *G01C 21/3629* (2013.01); *G01C 21/3652* (2013.01); *G06F 3/167* (2013.01); *G09B 21/003* (2013.01); *G09B 21/006* (2013.01); *H04W 4/02* (2013.01); *A61H 2003/063* (2013.01); *A61H 2201/50* (2013.01); *A61H 2201/5012* (2013.01); *A61H 2201/5048* (2013.01); *A61H 2201/5064* (2013.01)

(58) Field of Classification Search
CPC .......... A61H 3/061; G01C 21/20; H04W 4/04
See application file for complete search history.

(56) References Cited

U.S. PATENT DOCUMENTS

2004/0030491 A1* 2/2004 Hull ........................ H04L 29/06
                                                                    701/433
2005/0099291 A1* 5/2005 Landau .................. A61H 3/061
                                                                  340/539.13
(Continued)

FOREIGN PATENT DOCUMENTS

EP         2733502 A1    5/2014
WO    WO 2010/002284 A2    1/2010
WO    WO 2010/037839 A1    4/2010

*Primary Examiner* — Fabricio R Murillo Garcia
(74) *Attorney, Agent, or Firm* — BakerHostetler

(57) ABSTRACT

In order to guide a person along a path, audible acoustic signals are used, which are generated by signal generators arranged in an area. The person can orient themselves in the area using these acoustic signals. As the person moves along the path towards a destination, the signal generator arranged next in line on the path generates an acoustic signal, in which direction the person can then move. A signal generator generates an acoustic signal of this type, when it receives a control command from a mobile device carried with the person or from a control device.

26 Claims, 2 Drawing Sheets

(51) Int. Cl.
 *G01C 21/36* (2006.01)
 *G06F 3/16* (2006.01)
 *G09B 21/00* (2006.01)
 *H04W 4/02* (2018.01)

(56) References Cited

U.S. PATENT DOCUMENTS

2011/0172907 A1* 7/2011 Rui Da Silva Freitas ................ G09B 5/04
 701/533
2014/0335897 A1   11/2014 Clem et al.
2016/0025837 A1*  1/2016 Hillier ................... G01S 5/0054
 342/386
2017/0307719 A1* 10/2017 Said ........................ H04W 4/33

* cited by examiner

GUIDING PEOPLE USING ACOUSTIC SIGNALS

CROSS-REFERENCE TO RELATED APPLICATION

This application is the national phase application under 35 U.S.C. § 371 claiming the benefit of priority based on International Patent Application No. PCT/EP2016/074199, filed on Oct. 10, 2016, which claims the benefit of priority based on European Patent Application No. 15190261.6, filed on Oct. 16, 2015. The contents of each of these applications are herein incorporated by reference.

FIELD OF THE INVENTION

The technology described here generally relates to guiding a person with impaired eyesight along a route from a starting point to a destination. Exemplary embodiments of the technology relate in particular to a method and a system for guiding a person with impaired vision with the aid of spatially distributed signal generators.

BACKGROUND OF THE INVENTION

WO 2010/037839 describes a method for guiding a person in a building, in which at specified points (doors, paths, junctions, lifts, etc.) information points are present, that are either actively connected to an EDP computer system or passively not connected to any EDP system, wherein each information point stores its own local position code. By means of a guiding application on their mobile device, the person can enter their disability and a destination. If while on the route to their final destination the person enters the coverage area of an information point, the mobile device receives the position code of this information point and then information for their guidance is determined. The information for the guidance is communicated to the person either visually or acoustically using the mobile device.

Although WO 2010/037839 describes a means for guiding a person, there may be situations in which the communication of the guidance information for the person may not be unique, in particular if the person is either almost or completely blind, because the interpretation of the guidance information can depend on the direction in which the person, and therefore the mobile device, are oriented. For example, an instruction "straight ahead" leads in the opposite direction if the person turns through 180°.

US 2005/0099291 describes a system for guiding people whose eyesight is impaired. The system comprises a central computer and Audio Beacons, which are controllable thereby. If a person wants route guidance in this system, they use their mobile telephone to enter a destination. The computer thereupon determines the path to the destination, calculates the distances between the audio beacons and activates the audio beacons. The position of a person in this system is determined by means of RFID technology. Because additional RFID devices are required for the purpose, the complexity of the system is increased.

There is therefore a need for an improved technology for route guidance.

SUMMARY OF THE INVENTION

One aspect of such a technology therefore relates to a method for guiding a person in an area in which a plurality of signal generators are arranged at fixed locations. In accordance with the method, a present position of a mobile device carried by the person in the area is determined and a signal generator is identified, which is the next one that will be reached by the person based on their current position. A control command is sent to the identified signal generator, wherein the control command causes the identified signal generator to generate a signal that is perceptible by the person.

Another aspect relates to a system for guiding a person within an area. The system comprises a mobile device, which can be carried by the person, a plurality of signal generators arranged at specified locations in the area, and a processor with a software program for route guidance that can be executed in the processor. In operation, if the processor determines a present position of the mobile device in the area, it identifies a signal generator, which is the next one that will be reached by the person based on their present position, and sends a control command to the identified signal generator, wherein the control command causes the identified signal generator to generate a signal that is perceptible by the person.

In some of the exemplary embodiments described here the guidance is based on audible acoustic signals, which the signal generators generate and on the basis of which the person can orientate themselves. If the person is moving along a path to a destination location, the signal generator which is arranged nearest to them along the path generates an audible signal, in the direction of which the person can then move. The acoustic signals are generated consecutively in time, in order to guide the person along the path from signal generator to signal generator. In contrast to the above described prior art technology, the person is not oriented based on information which is communicated to them locally by their mobile device, but rather by means of acoustic signals generated at remote locations. How the person is currently positioned or holds the mobile device, is therefore immaterial.

Blind people in particular usually have exceptionally good hearing. In determining the parameters of an acoustic signal, e.g. volume, type (e.g. continuous sound, modulated or pulsed sound), frequency and duration, this property can be taken into account in order to choose an acoustic signal that is easily audible for blind people, but which is not annoying or unpleasant for other people. One or more of these parameters can be optimized in order to simplify the orientation and/or localisation; for example, higher tones can be better localised than lower tones. In one exemplary embodiment, the person can specify how certain signals should sound to them. Such a specification can be performed by means of a software application installed on the mobile device. In one exemplary embodiment, the software application can display a panel on a display screen, which if touched by the person, causes the desired signal to be sounded on the mobile device or a signal generator. In the event that multiple persons are being guided in one area and, in certain circumstances, multiple signals are generated at about the same time, it is then easier for the person to distinguish the signal intended for them from the other signals. In one exemplary embodiment, the acoustic signal can also be a voice message.

The time at which the relevant signal generator generates the acoustic signal is determined based on the current location of the person. In one exemplary embodiment, the location is determined by the fact that the person's mobile device receives the identifier of the signal generator arranged at this location. The identifier and the location of the signal generator are stored in a data record in a database, so that the location can be determined from this. Using the determined location in relation to the person's route, the signal generator which should be the next one to generate an acoustic signal is identified.

In one exemplary embodiment, the determination of the signal generator that is the next one to be reached by the person based on their present position is performed by the mobile device. In one exemplary embodiment, the mobile device also performs the transmission of the control command to the identified signal generator. The mobile device thus performs essential functions of the guidance. This enables the use of relatively simple and cost-effective signal generators, such as Bluetooth beacons.

In one exemplary embodiment, the current position is determined when a first signal generator receives data from the mobile device. If the signal generator, which is arranged at a specified location, receives the data, the current position is set identical to the specified location of the first signal generator. The mobile device is then located at or in the vicinity of this signal generator.

In one exemplary embodiment, the determination of the signal generator that is the next be reached by the person based on their present position is performed by a control device. Transmitting the control command to the identified signal generator can be performed by the control device. In one exemplary embodiment the control command can be transmitted over a network, to which the signal generators are linked.

The use of these possibilities mentioned results in a high level of flexibility with regard to the implementation of the technology for route guidance described here. The route guidance function can be performed substantially by the mobile device, which communicates with simple signal generators, or else by the control device. The control device in turn communicates with the signal generators, which in their turn detect whether the mobile device is in their vicinity. For the purpose of the route guidance, the mobile device acts as a kind of signal transmitter, which only sends its ID.

In one exemplary embodiment, greater flexibility in the implementation is obtained by the fact that destination suggestions can be made to the person at different places, from which they can choose one. In this case, based on the current position, at least one destination suggestion is generated, wherein the at least one destination suggestion is reachable via a path starting from the current position. The destination suggestion is transmitted to the person by using the mobile device. After the destination has been selected by the person, a signal generator, which is arranged at the destination, is identified and the control command is sent to the signal generator arranged at the destination, where the signal generator will generate the signal perceptible by the person.

In one exemplary embodiment, the signal generator and the mobile device are equipped with Bluetooth technology and communicate with each other using this technology. Smartphones are typically already equipped with facilities for this technology, so that no special mobile devices are needed for the guidance described here. Such smartphones can communicate with Bluetooth-enabled signal generators, so-called beacons.

In one embodiment the signal generators are arranged in such a way that adjacent signal generators, or rather their locations, can be reached without an intervening obstacle (e.g. wall, pillar, door, sales kiosk, etc.). In case an obstacle does exist, either because its avoidance is not feasible or because of a temporary obstacle (e.g. construction site), then a signal generator can be attached to this obstacle. This signal generator can inform the person of this obstacle, for example. These options for the arrangement of the signal generators assist the person to navigate along their path safely and efficiently.

BRIEF DESCRIPTION OF THE DRAWINGS

Below, different aspects of the improved technology are described in greater detail on the basis of exemplary embodiments and in conjunction with the figures. In the figures, identical elements have the same reference numerals, wherein.

DETAILED DESCRIPTION OF EMBODIMENTS OF THE INVENTION

Figure 1:
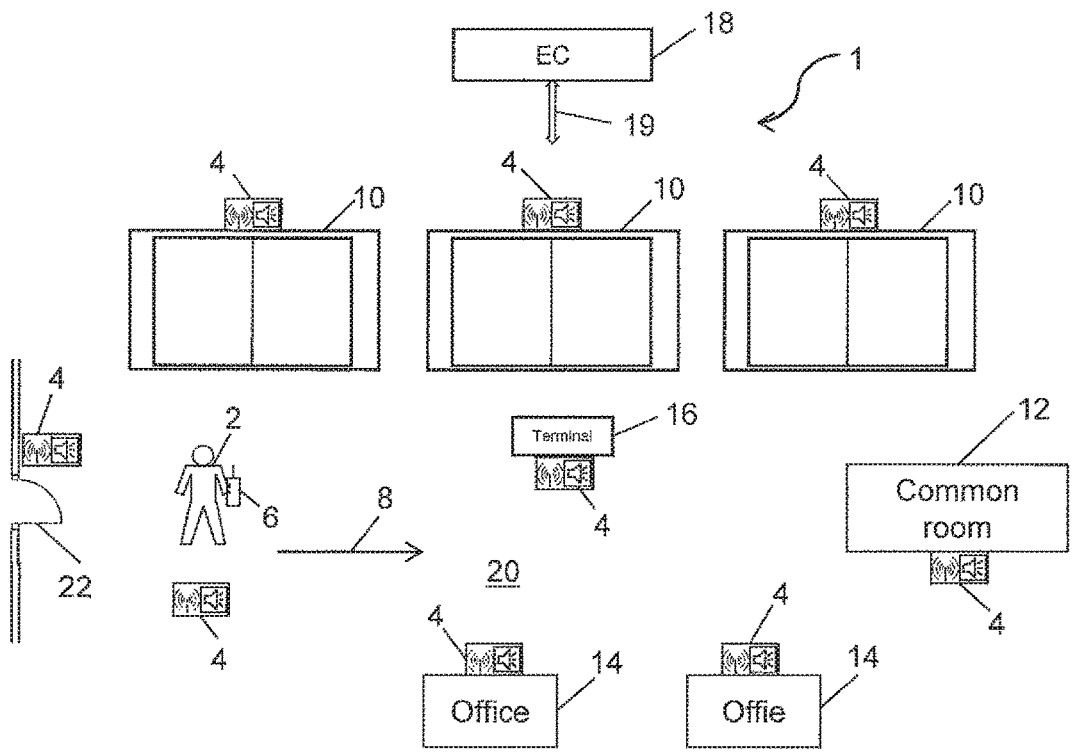
FIG. 1 is a schematic illustration of an exemplary situation in a building, in which a person can move along a path.

FIG. 1 is a schematic representation of an exemplary situation in a building 1, in which a person 2 moves along a path 8 by means of a guidance system in the direction of a destination. The person skilled in the art will recognize that the technology is not limited to guidance within the building 1, but can also be used in other areas, for example, outside of the building 1, for example for guidance along roads. The building 1 (e.g. residential house, office and business building, hotel, sports arena, airport building, factory) is thus to be understood as an example of an area in which the path can extend.

In the exemplary situation shown in FIG. 1 the person 2, who is carrying a mobile device 6, is located on a building floor 20 and moves along the path 8. The access 22 is an external door of a building, for example, through which the building 1 can be entered and exited, for example, at street level. FIG. 1 also shows a plurality of office or meeting rooms 14, a common room 12, three lifts 10, one floor terminal 16 and a plurality of signal generators 4. A lift controller 18, which is also shown, is communicatively connected to the lifts 10 and the floor terminal 16 (indicated by a double arrow 19), in order to control the lifts 10 in accordance with a travel request.

The path 8 can be specified in different ways. The person 2 can, for example, have the intention to go from a starting point to a (single) destination, possibly via one or more intermediate destinations or places of interest. In one exemplary embodiment, the person 2 can enter the desired destination on the mobile device 6 already at the starting location. The path 8 to the destination is thus specified before the person 2 begins to move along the path 8. In this case, the path 8 defines the route between the starting location and the destination. With knowledge of the starting location, the destination and associated mapping material (e.g. building plan, city map, etc.), the path 8 and associated guidance information can be determined, in order to guide the person 2 safely and efficiently to their destination. On the basis of a current location of the person 2 or a signal generator 4 which is present there, the next signal generator 4 along the path 8 is identified and is caused to generate a signal perceptible by the person 2. In one exemplary embodiment an audible acoustic signal is generated. This procedure is repeated automatically at each signal generator 4 located on the path 8 and without further action by the person 2, until they reach their destination.

In another case, the person 2 does not specify a destination. Instead, they can select a destination at their current whereabouts. Based on the current whereabouts, the technology described here offers the person 2 possible destinations, from which the person 2 can select one. In this case, the path 8 consists of the route from the current location to the next destination, and the technology described here guides the person 2 along the path 8 to the next destination. If another destination is selected there, a new path 8 is determined.

Figure 2:
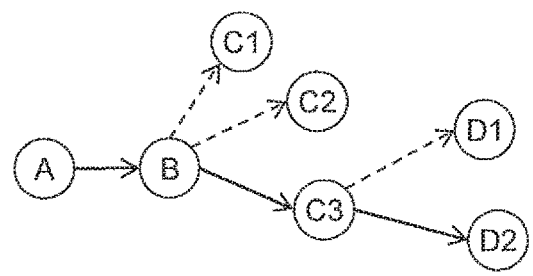
FIG. 2 is a schematic illustration of an exemplary guidance along multiple locations.

FIG. 2 shows the case mentioned, in which the person 2 does not specify a destination, for example, in a general form: the person 2 can go from a location A to a location B. Once arrived there, the person has 2 the choice to go to possible locations C1, C2 or C3 communicated to them. If they opt for location C3 (see solid arrow), the signal generator 4 arranged at the location C3 generates an acoustic signal audible to the person 2, which the person 2 can follow. When they arrive at the location C3, the person 2 has the choice to go to a location D1 or location D2. In FIG. 2, the person 2 decides on the location D2 (see solid arrow) and the signal generator 4 positioned at the location D2 generates an audible acoustic signal, which the person 2 can follow to location D2.

Applied to the situation of FIG. 1, the person 2 coming from the access 22 (location A) is located in the range of access 22 (location B). There (location B), the person has the choice to go either to the lift 10 (location C1), floor terminal 16 (location C2) or office 14 (location C3). In one exemplary embodiment the mobile device 6 communicates these options to the person in an audible manner. If the person 2, for example, using speech input, selects the office 14 (location C3), the signal generator 4 arranged there generates an audible acoustic signal and the person 2 moves in the direction of the acoustic signal, in order to reach the office 14 (location C3). There, the person 2 has the choice either to go to another office 14 (location D1) or to the common room 12 (location D2). If the person selects the common room 12, the signal generator 4 arranged there generates an audible acoustic signal.

A similar situation can obtain, for example, in a building 1 with a plurality of adjacent offices 14 or workstations, or in a shopping centre with adjacent shops. If the person 2 is moving in this kind of environment, the mobile device 2 can indicate, for example, the names of the people working in the offices 14, or the names of the shops. The person 2, for example, inside or in front of an office 14 or shop, can choose which person or which shop they would like to reach.

The signal generators 4 can be activated individually, in order to trigger the generation of a signal. To enable the activation, each signal generator 4 can be addressed via an individual identifier or address; for example, in one exemplary embodiment the mobile device 6 addresses a control command to the desired signal generator 4. Alternatively, in another exemplary embodiment each signal generator 4 is networked with a control device 17 (see FIG. 3), which activates the signal generators 4 either over signal lines, a bus system or network. Even in these alternatives, the control device 17 can address a control command to a desired signal generator 4. In these exemplary embodiments, the control command can be transmitted using a cable-bound signal and/or a wireless signal. The addressed signal generator 4 in each case generates the signal after receiving the control command, while any adjacent signal generators 4, which are not addressed, remain silent. The person skilled in the art will recognize that a plurality of signal generators 4 can also be controlled, for example, to create an effect like a travelling light along the direction of the path 8.

Referring to FIG. 1 again, the signal generators 4 there are arranged at various points within the building 1. For example, they can be arranged at locations that may be frequented by people inside the building 1. In the exemplary embodiment shown in FIG. 1, one signal generator 4 each is arranged at various different locations, such as the rooms 12, 14, the access 22, in the area of access 22, the floor terminal 16 and the lifts 10. The signal generators 4 can generally also be arranged in the immediate vicinity of these locations. The person skilled in the art will recognize that the number of the signal generators 4 and their arrangement, including a distance from one or more adjacent signal generators 4, can be selected, for example, depending on the building situation. As mentioned above, adjacent signal generators 4 can be arranged such that there are no obstacles located between them. The arrangement of the signal generators 4 can be documented, for example, in a building plan or, if the route guidance takes place along roads in a city, a city map.

In one exemplary embodiment, the mobile device 6, which the person 2 is carrying, is designed to receive data from a signal generator 4 (for example, its identification number or identifier), by means of which a current location of the mobile device 10 can be determined. The reception takes place in a contactless manner, for example by scanning an optical code (e.g. QR code, barcode, colour code) or establishing a wireless connection based on one of the known technologies for near-field communication (NFC), Wi-Fi Direct, RFID or Bluetooth.

In another exemplary embodiment, the mobile device 6 has a facility for position determination, for example, a device for the Global Positioning System (GPS). For determining the position of the mobile device 6 it is also possible to use a positioning system for buildings, also known as an Indoor Positioning System (IPS). Such an IPS can be implemented by appropriately arranged local radio cells (e.g. WLAN nodes).

In some of the exemplary embodiments described here, the position determination takes place by means of the signal generator 4. In these exemplary embodiments, the mobile device 6 is a Bluetooth-enabled smartphone, and the signal generators 4 are also similarly Bluetooth-enabled. Such a signal generator 4 is, therefore, designated hereafter as a "beacon" or as a "Bluetooth beacon". The communication between the mobile device 6 (smartphone) and the beacons thus takes place in accordance with the Bluetooth standard, such as Bluetooth standard 4.0 (Bluetooth Low Energy (BLE)) or any other Bluetooth standard. Such beacons are usually battery-powered transmitters with low power consumption, which permanently broadcast a unique identification number (identifier) at short intervals of approximately one second in accordance with a specified transmission protocol. A beacon is addressable, for example by its MAC address (Media Access Control).

As mentioned, a beacon always broadcasts the same data, for example its identification number (e.g. "ID=5"). If the mobile device 6 (with the Bluetooth function activated) is in radio range of the beacon, the mobile device 6 receives the broadcast data. The person skilled in the art will recognize that a plurality of mobile devices can be in radio range and that each of these mobile devices can then receive the data. These data can be used to determine that the mobile device 6 is currently located, for example, in the vicinity of the beacon with "ID=5". Accordingly, no data is received when the mobile device 6 is located outside of the radio range again. The person skilled in the art will recognize that in one exemplary embodiment a pairing, well-known from Bluetooth technology, is not provided, for example because of the plurality of beacons distributed in the building 1 and any (one-time) visitors that may be present in the building 1. If it should be provided, however, it is assumed here that a first communicative contact (i.e. the pairing) between the mobile device 6 and the beacons has already occurred. During pairing the communication partners exchange identification data, so that they automatically recognize each other the next time.

The capability of a beacon to be able to enter into a communicative connection with the mobile device 6, is illustrated in FIG. 1 by a symbol for radio transmission. In addition to this functionality, the beacon can generate an acoustic signal audible by the person 2. This functionality is illustrated in FIG. 1 by a loudspeaker symbol. An example of a beacon having these functionalities which can be used is an Enterprise Beacon supplied by the company Onyx Beacon Ltd., Romania. Such a beacon has a buzzer, in order to generate an audible acoustic signal, and an adhesive side for positioning such a beacon at a desired location.

In another exemplary embodiment, a loudspeaker or buzzer can also be arranged separately from the beacon. The speaker or buzzer can be connected to the beacon either via a cable or wirelessly. If the Beacon receives a control command from the mobile device 6, the beacon activates the loudspeaker or buzzer in accordance with the control command.

A beacon with a buzzer or loudspeaker not only broadcasts the identification number mentioned, but can also receive a control command addressed thereto. The beacon has an electronic circuit for receiving a corresponding radio signal for this purpose. A control command can, for example, cause the buzzer to activate in order to generate an acoustic signal.

With the understanding of the described function of a beacon it is apparent that even a Bluetooth-enabled smartphone can be used as a kind of beacon, even if it cannot be considered a stationary beacon. The smartphone broadcasts its identifier at regular intervals, which can then be received by another Bluetooth-enabled device which is located within range. In one exemplary embodiment, the terminal 16 shown in FIG. 1 can either be such a Bluetooth-enabled device, or contain one. Similarly to the distributed signal generators 4, a plurality of such Bluetooth-enabled devices can be present at specified sites in the area 1, which are then documented in the building plan.

Figure 3:
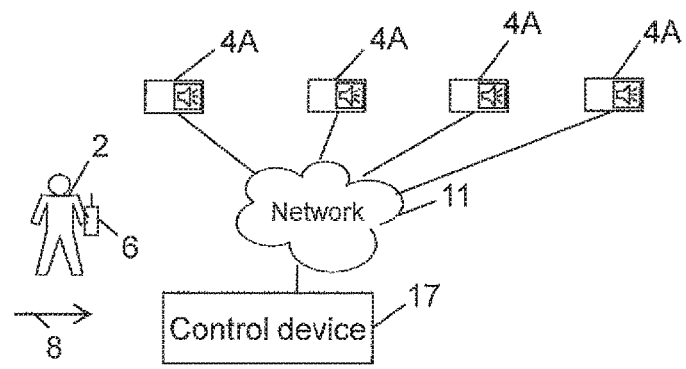
FIG. 3 is a schematic illustration of an example communication system.

In the exemplary embodiment shown in FIG. 1, the signal generators 4 broadcast their identification numbers, and the mobile device 6 determines the current position from a received identification number and then performs the route guidance, including the activation of the next signal generator 4. In this exemplary embodiment the signal generators 4 communicate exclusively with the mobile device 6. In another exemplary embodiment, the mobile device 6 is used as a kind of mobile beacon and at least a part of the guidance function takes place outside of the mobile device 6. FIG. 3 shows a schematic representation of an exemplary communication system for this exemplary embodiment.

The communication system shown in FIG. 3 comprises a plurality of signal generators 4A and the control device 17 already mentioned above, which are linked to a network 11. In addition to this, the person 2 who is moving along the path 8 with their mobile device 6 is shown, and whose mobile device 6 is also linked to the network 11. Depending on the design, the network 11 may be intended for a cable-bound communication and/or a radio communication and may comprise a bus system, a LAN, a WLAN, a mobile wireless network and/or the internet for the purpose. The network 11 can also form part of an IT infrastructure for cloud computing, which refers, for example, to the storage of data in a remote data centre, but also to the execution of programs that are not installed locally, but remotely. Depending on the design, a specific functionality can either be installed in the mobile device 6 or made available via the "cloud". The signal generator 4A and the control device 17 are accordingly linked to the network 11 by means of cables or wireless connections.

In contrast to the signal generators 4 shown in FIG. 1, the signal generators 4A shown in FIG. 3 cannot be implemented as a beacon. In the exemplary embodiment shown in FIG. 3, the signal generators 4A are therefore only shown with a symbol for a loudspeaker. The current position of the mobile device 6 can be determined, for example, by means of the GPS function present in the mobile device 6 or using an indoor positioning system (IPS) as mentioned above. The mobile device 6 is configured to transmit the resulting current function to the control device 17, for example by means of the mobile wireless network. The control device 17 therefore knows where the mobile device 6 is located.

If the current position, on the other hand, is to be determined by means of the location of the signal generator 4A, then in one embodiment the signal generator 4A can also be designed with a radio module (e.g. as a Bluetooth radio module), which communicates with the mobile device 6. As soon as a communicative connection is established between the radio module of the signal generator 4A and the mobile device 6, the signal generator 4A receives the ID of the mobile device 6 and transmits it in a message to the control device 17 over the network 11. The control device 17 has a processor, in which a software program for route guidance can be executed. The message may contain an address of the transmitting signal generator 4A and/or arrive at a signal input of the control device 17 provided for the transmitting signal generator 4A. The locations of the individual signal generators 4A are stored in the control device 17. With knowledge of the address and/or the signal input, the control device 17 can identify the transmitting signal generator 4A and determine its location. The control device 17 therefore knows that the mobile device 6 is located near the transmitting signal generator 4A.

As a further function of the route guidance, the control unit 17 then determines the signal generator 4A, which is next along the path 8. The control device 17 then sends a control command to this signal generator 4A, either addressed to it or from a signal output that is specified for this signal generator 4A. In response to the control command, the signal generator 4A generates the signal.

From the foregoing, the person skilled in the art will recognize that the technology for route guidance described here can be implemented either in the mobile device 6 (see FIG. 1) or in the control device (see FIG. 3). In both exemplary embodiments, the mobile device 6 is used, which can be configured depending on where the guidance is to be implemented.

Figure 4:
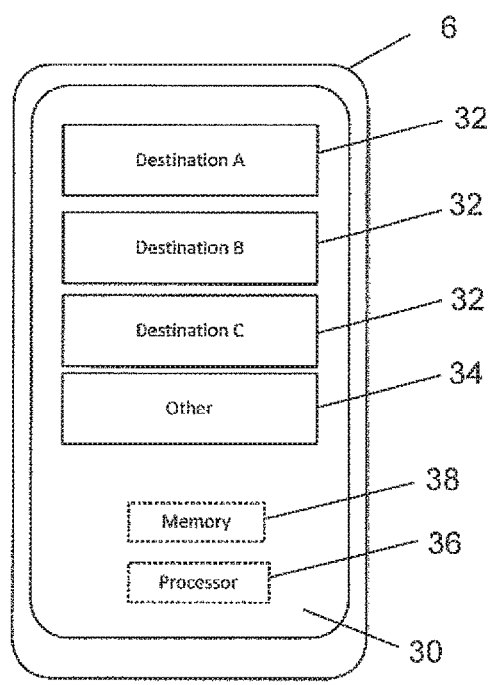
FIG. 4 is a schematic illustration of a mobile device.

FIG. 4 illustrates a smartphone as an example of a mobile device 6. In this, a storage device 38 (Memory) and a processor 36 located underneath a display 30 (Touch Screen), are not visible from the outside (therefore shown by dashed lines). By means of the user interface, the person 2 can adjust settings and desired functions on the mobile device 6 to suit their needs. For example, the Bluetooth function can be enabled and disabled; the latter, for example, to safeguard the user's privacy, because without the Bluetooth function the movements and whereabouts of the person 2 in the building 1 cannot be determined. In addition, a software application (app) for route guidance can be activated and deactivated by the person 2. If necessary, the person 2 can activate the Bluetooth function and the software application. Depending on the design, the software application can be activated automatically when a beacon is nearby, or else be always active when the mobile device 10 is switched on.

The smartphone as an example of a mobile device 6 supports the person 2 during the guidance. Since the person 2 is visually impaired or blind and visual indications on a display 30 of the mobile device 6 may be poorly detected by the person 2 or not at all, the smartphone can be designed specifically for such handicaps. The smartphone can be designed, for example, in hardware and/or software (e.g. by means of a software application) for speech input and speech output, so that the person 2, for example with voice support, is guided through a menu and can make a desired selection and/or input by spoken commands. The mobile device 6 can, for example, detect a destination spoken by the person 2, process this and generate guidance information. As an illustration of examples of selection options FIG. 4 indicates a plurality of destinations (Destination A, Destination B, Destination C, Other), which are assigned to different destination selection fields 32, 34 on the display 30. The mobile device 6 can communicate these destinations to the person 2 by means of speech.

Figure 5:
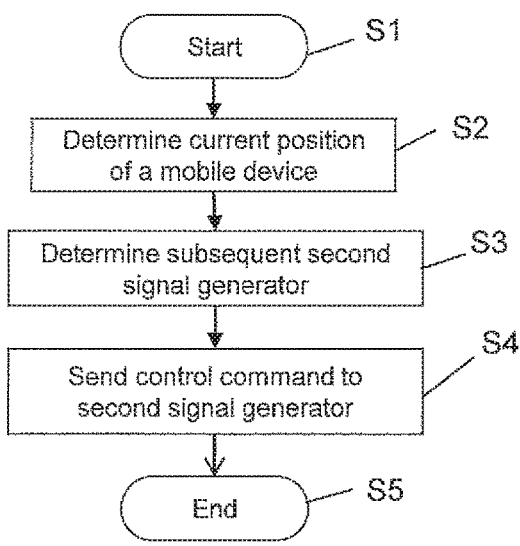
FIG. 5 is an example illustration of a method for guiding a person on the basis of a schematic flowchart.

With the understanding of the principal system components described above (mobile device 6, signal generator 4, signal generator 4A) and their functionalities, in the following a description of an example method for route guidance is given by reference to FIG. 5. In this exemplary embodiment, the route guidance is implemented in the mobile device 6, which communicates with the Bluetooth-enabled signal generators 4 (beacons). The example method starts in a step S1 and ends in a step S5.

The mobile device 6 and the beacons are part of a system that supports the guidance of the person 2 along the path 8. In this system the mobile device 6 interacts with the beacons, wherein the individual identifier (e.g. "ID=5") of a beacon is received by the mobile device 6. In a step S2, the current position of the mobile device 6 can thereby be determined. The mobile device 6 (or a software application installed thereon for route guidance (guidance app)) uses the received identifier of a beacon, to determine the location of this beacon and thus its own location. The identification can either be performed locally by the guidance app, or else by means of an access to a remotely arranged database initiated by the guidance app.

In the case of local determination, the guidance app uses building plan information and data records that are stored in the mobile device 6 in the storage device 38. Each data record stores the location of a beacon together with its identifier. The number of such data records is equal to the number of beacons. The building plan information can be stored, for example, during the installation of the guidance app on the mobile device 6, so that it is already present when the person 2 inputs the destination. If the guidance app receives the identifier of the beacon, then it can then be used to determine the location of the beacon in the building 1 (e.g. "ID=5" at access 22).

In the case of determination by access to a remote database, the guidance app initiates an access to a database using a wireless connection. In this database the identifier is associated with data relating to a location at which this beacon is arranged. The database can be held in a storage system of a building management system, a storage system of a service provider or a storage system of the lift controller 18. When accessing the database, an identification parameter (e.g. telephone number and/or device ID code (Media Access Control (MAC) address)) of the mobile device 6 accessing the database can also be transmitted.

The person skilled in the art will recognize that in another exemplary embodiment, the current position of the mobile device 6 can also be determined using one of the above-mentioned GPS and IPS systems.

Irrespective of how and where the determination takes place, the guidance app sets the determined location in relation to the path 8. In one exemplary embodiment, the mobile device 6 can represent the path 8 graphically on a building plan. In addition, it can show the current location along the path 8 graphically on the building plan. The mobile device 6 can generate a corresponding voice message to communicate this information to the person 8, especially if their eyesight is severely impaired.

With knowledge of the location of the beacon and, hence, of the mobile device 6, in a step S3 the guidance app determines the beacon that is next in sequence along the path 8. In a step S4 the guidance app generates a control command, which causes this beacon to generate an acoustic signal, for example by means of a buzzer. The nature of the signal can be defined by the person 2 using the guidance app, so that the person 2 detects "his/her" signal, even if multiple signals are generated in their environment for other guidance purposes. The person 2 hears this acoustic signal and can go in the direction of the beacon generating the acoustic signal. This process repeats itself along the way on the path 8 at each beacon located along the path 8, until the person 2 reaches their destination.

In one exemplary embodiment, the acoustic signal can also comprise a warning signal or a voice message, for example, to warn of an obstacle. The voice message may also in some cases indicate the type of obstacle. As mentioned above, an obstacle can be either permanent or temporary.

As is explained in detail elsewhere in this description, in one embodiment the person 2 orients themselves with the technology described here using the beacons, which generate an acoustic signal. The person skilled in the art will recognize, however, that information for the guidance can nevertheless also be transmitted to the person 2 by means of the mobile device 6. Depending on the degree of an existing visual impairment of the person 2, this information can be presented on the display 30, e.g. as text, graphical symbols (e.g. arrows), maps and/or pictures of places, communicated by means of speech or another mechanism, for example by means of a vibration of the mobile device 6. The guidance information informs or instructs the person 2, for example, where they should go next and/or how large the distance to the next waypoint is. If a lift 10 must be used, it can also be communicated to the person 2, for example, which elevator 10 must be used, when it arrives on a particular floor, and/or how long the waiting time is until an elevator cabin arrives. The person skilled in the art will also recognize that the guidance information can be communicated to the person 2 also by means of so-called smartwatches or other wearable devices (e.g. glasses with display and loudspeaker, possibly in conjunction with technology that allows the function of augmented reality).

The invention claimed is:

1. A method for guiding a person in an area, in which a plurality of signal generators are arranged at specified locations, the method comprising:
   determining a current position of a mobile device in the area, wherein the current position is determined as a result of the mobile device communicating with a first signal generator or a control device;
   identifying a next signal generator which will be reached by the mobile device starting from the current position;
   sending a control command to the identified next signal generator, wherein the control command causes the identified next signal generator to generate a signal perceptible by the person; and
   wherein the mobile device communicating with the first signal generator includes a transmission to the first signal generator by the mobile device of a mobile device identification, wherein the first signal generator then communicates with a control device which determines a location of the mobile device to be associated with a location of the first signal generator.

2. The method according to claim 1, wherein the first signal generator communicating with the control device includes a transmission to the control device by the mobile device of its location as determined by the mobile device using a Global Positioning System (GPS) or Indoor Positioning System (IPS) system.

3. The method according to claim 2, in which the identification of the next signal generator is performed by the mobile device and the sending of the control command to the identified next signal generator is executed by the mobile device.

4. The method according to claim 1, in which the identification of the next signal generator is performed by the control device, and the sending of the control command to the identified next signal generator is executed by the control device.

5. The method according to claim 1, further comprising:
   based on the current position, generating at least one destination suggestion, wherein the at least one destination suggestion is reachable from the current position via a path;
   transmitting the at least one destination suggestion to the mobile device and receiving a selection of a particular destination from the mobile device;
   based on the particular destination selection, identifying a signal generator, which is arranged at the destination; and
   sending the control command to the signal generator arranged at the destination in order to generate the perceptible signal, using the signal generator.

6. The method according to claim 1, in which the signal generators and the mobile device are equipped with and communicate using Bluetooth technology.

7. The method according to claim 1, in which the generated signal is an acoustic signal.

8. A system for guiding a person in an area, comprising:
   a mobile device;
   a plurality of signal generators, which are arranged at fixed locations in the area, and
   a processor having a software program for guidance, which is executable in the processor, wherein in operation the processor:
   determines a current position of the mobile device in the area, wherein the current position is determined when the mobile device communicates with a first signal generator;
   identifies a next signal generator; which will be reached by the mobile device starting from the current position;
   sends a control command to the identified next signal generator, wherein the control command causes the identified next signal generator to generate a signal which is perceptible by the person; and
   wherein the mobile device communicating with the first signal generator includes a transmission to the first signal generator by the mobile device of a mobile device identification, wherein the first signal generator then communicates with a control device which determines a location of the mobile device to be associated with a location of the first signal generator.

9. The system according to claim 8, in which the processor is arranged in the mobile device.

10. The system according to claim 8, in which the processor is arranged in a control device.

11. The system according to claim 8, in which the signal generators are equipped with Bluetooth technology.

12. The system according to claim 8, wherein each signal generator has an assigned network address, and a control device determines an identity of a particular signal generator based on the signal generator's network address.

13. The system according to claim 8, wherein the mobile device communicating with the first signal generator includes a transmission to a control device by the mobile device of its location as determined by the mobile device using a Global Positioning System (GPS) or Indoor Positioning System (IPS) system.

14. A system for guiding a person in an area, comprising:
    a mobile device;
    a plurality of signal generators, which are arranged at fixed locations in the area, and
    a processor having a software program for guidance, which is executable in the processor, wherein in operation the processor:
    determines a current position of the mobile device in the area, wherein the current position is determined when the mobile device communicates with a first signal generator;
    identifies a next signal generator which will be reached by the mobile device starting from the current position;
    sends a control command to the identified next signal generator, wherein the control command causes the identified next signal generator to generate a signal which is perceptible by the person; and
    wherein the mobile device communicating with the first signal generator includes a transmission by the first signal generator of its identification to the mobile device, wherein the mobile device utilizes the first signal generator identification to determine a location of the first signal generator from a pre-stored list of locations and determines a location of the mobile device as being associated with the location of the first signal generator.

15. The system according to claim 14, in which the processor is arranged in the mobile device.

16. The system according to claim 14, in which the processor is arranged in a control device.

17. The system according to claim 14, in which the signal generators are equipped with Bluetooth technology.

18. The system according to claim 14, wherein each signal generator has an assigned network address, and a control device determines an identity of a particular signal generator based on the signal generator's network address.

19. The system according to claim 14, wherein the mobile device communicating with the first signal generator includes a transmission to a control device by the mobile device of its location as determined by the mobile device using a Global Positioning System (GPS) or Indoor Positioning System (IPS) system.

20. A method for guiding a person in an area, in which a plurality of signal generators are arranged at specified locations, the method comprising:
   determining a current position of a mobile device in the area, wherein the current position is determined as a result of the mobile device communicating with a first signal generator or a control device;
   identifying a next signal generator which will be reached by the mobile device starting from the current position;
   sending a control command to the identified next signal generator, wherein the control command causes the identified next signal generator to generate a signal perceptible by the person; and
   wherein the mobile device communicating with the first signal generator includes a transmission by the first signal generator of its identification to the mobile device, wherein the mobile device utilizes the first signal generator identification to determine a location of the first signal generator from a pre-stored list of locations and determine a location of the mobile device as being associated with the location of the first signal generator.

21. The method according to claim 20, wherein the first signal generator communicating with the control device includes a transmission to the control device by the mobile device of its location as determined by the mobile device using a Global Positioning System (GPS) or Indoor Positioning System (IPS) system.

22. The method according to claim 20, in which the identification of the next signal generator is performed by the mobile device and the sending of the control command to the identified next signal generator is executed by the mobile device.

23. The method according to claim 20, in which the identification of the next signal generator is performed by the control device, and the sending of the control command to the identified next signal generator is executed by the control device.

24. The method according to claim 20, further comprising:
   based on the current position, generating at least one destination suggestion, wherein the at least one destination suggestion is reachable from the current position via a path;
   transmitting the at least one destination suggestion to the mobile device and receiving a selection of a particular destination from the mobile device;
   based on the particular destination selection, identifying a signal generator, which is arranged at the destination; and
   sending the control command to the signal generator arranged at the destination in order to generate the perceptible signal, using the signal generator.

25. The method according to claim 20, in which the signal generators and the mobile device are equipped with and communicate using Bluetooth technology.

26. The method according to claim 20, in which the generated signal is an acoustic signal.

* * * * *